(12) United States Patent
Paska et al.

(10) Patent No.: US 11,228,050 B2
(45) Date of Patent: Jan. 18, 2022

(54) MULTI-METALLIC ELECTRO-CATALYST FOR ALKALINE EXCHANGE MEMBRANE FUEL CELLS AND METHOD OF MAKING SAME

(71) Applicant: HYDROLITE LTD, Caesarea (IL)

(72) Inventors: Yair Paska, Kiryat Ata (IL); Miles Page, Hod Hasharon (IL); Charly David Azra, Harish (IL); Ben Achrai, Pardes Hanna (IL); Anna Kitayev, Rosh Ha Ayin (IL)

(73) Assignee: HYDROLITE LTD, Caesarea (IL)

( * ) Notice: Subject to any disclaimer, the term of this patent is extended or adjusted under 35 U.S.C. 154(b) by 129 days.

(21) Appl. No.: 16/636,064

(22) PCT Filed: Jul. 30, 2018

(86) PCT No.: PCT/IL2018/050845
§ 371 (c)(1),
(2) Date: Feb. 3, 2020

(87) PCT Pub. No.: WO2019/026068
PCT Pub. Date: Feb. 7, 2019

(65) Prior Publication Data
US 2020/0161686 A1    May 21, 2020

(30) Foreign Application Priority Data
Aug. 3, 2017 (IL) .......................................... 253814

(51) Int. Cl.
*H01M 8/1004* (2016.01)
*H01M 4/88* (2006.01)
(Continued)

(52) U.S. Cl.
CPC ....... *H01M 8/1004* (2013.01); *H01M 4/8892* (2013.01); *H01M 4/9016* (2013.01);
(Continued)

(58) Field of Classification Search
CPC .................................................... H01M 8/1004
See application file for complete search history.

(56) References Cited

U.S. PATENT DOCUMENTS

| 2004/0087441 | A1  | 5/2004  | Bock et al. |
| 2005/0282061 | A1* | 12/2005 | Campbell ............. H01M 4/881 429/483 |

(Continued)

FOREIGN PATENT DOCUMENTS

| EP | 1842589 | 10/2007 |
| GB | 2481309 | 12/2011 |

(Continued)

OTHER PUBLICATIONS

Ohyama J. et al. "High performance of Ru nanoparticles supported on carbon for anode electrocatalyst of alkaline anion exchange membrane fuel cell"; Journal of Power Sources, vol. 225 (2013), pp. 311-315.

(Continued)

*Primary Examiner* — Brian R Ohara
(74) *Attorney, Agent, or Firm* — Pearl Cohen Zedek Latzer Baratz LLP

(57) ABSTRACT

Some aspects of the invention may be directed to a catalyst layer for anodes of Alkaline Exchange Membrane Fuel Cells (AEMFC). Such catalyst layer may include catalyst nanoparticles and an ionomer. Each catalyst nanoparticle may include one or more nanoparticles of catalytically active metal supported on at least one nanoparticle of crystalline $RuO_2$. The diameter of the at least one nanoparticle of the crystalline $RuO_2$ may be about order of magnitude larger than the diameter of the one or more nanoparticles of catalytically active metal.

8 Claims, 7 Drawing Sheets

(51) Int. Cl.
*H01M 4/90* (2006.01)
*H01M 4/92* (2006.01)
*H01M 8/083* (2016.01)

(52) U.S. Cl.
CPC ........... *H01M 4/921* (2013.01); *H01M 4/926* (2013.01); *H01M 8/083* (2013.01)

(56) References Cited

U.S. PATENT DOCUMENTS

| | | |
|---|---|---|
| 2006/0251954 A1 | 11/2006 | Merzougui et al. |
| 2007/0128499 A1 | 6/2007 | Campbell et al. |
| 2008/0115875 A1 | 5/2008 | Jeng et al. |
| 2009/0130515 A1* | 5/2009 | Son ................... H01M 4/8828 429/481 |
| 2011/0207602 A1 | 8/2011 | Xu et al. |
| 2013/0122401 A1 | 5/2013 | Pietron et al. |
| 2014/0356761 A1 | 12/2014 | Gibbs et al. |
| 2015/0221954 A1* | 8/2015 | Niangar ............. H01M 4/9075 429/528 |

FOREIGN PATENT DOCUMENTS

| | | | |
|---|---|---|---|
| JP | 2007273278 | 10/2007 | |
| WO | WO-2013184269 A2 * | 12/2013 | ............ H01M 4/921 |

OTHER PUBLICATIONS

Lasch K. et al. "Mixed conducting catalyst support materials for the direct methanol fuel cell"; Journal of Power Sources, vol. 105, No. 2, pp. 305-310; published on-line Oct. 30, 2001.
Office Action for IL patent application No. 253814, dated Feb. 4, 2018.
Office Action for IL patent application No. 253814, dated Aug. 1, 2018.
International Search Report and Written Opinion for PCT Application No. PCT/IL2018/050845, dated Oct. 10, 2018.

* cited by examiner

MULTI-METALLIC ELECTRO-CATALYST FOR ALKALINE EXCHANGE MEMBRANE FUEL CELLS AND METHOD OF MAKING SAME

CROSS-REFERENCE TO RELATED APPLICATIONS

This application is a National Phase Application of PCT International Application No, PCT/IL2018/050845, International Filing Date Jul. 30, 2018, entitled: "MULTI-METALLIC ELECTRO-CATALYST FOR ALKALINE EXCHANGE MEMBRANE FUEL CELLS AND METHOD OF MAKING SAME", published on Feb. 7, 2019, under PCT International Application Publication No. WO 2019/026068, which claims the priority of Israel Patent Application No. 253814, filed on Aug. 3, 2017, which is hereby incorporated by reference in its entirety.

TECHNICAL FIELD OF THE INVENTION

The invention is generally related to the field of alkaline exchange membrane fuel cells and more precisely to catalysts for alkaline exchange membrane fuel cells.

BACKGROUND OF THE INVENTION

Alkaline exchange membrane fuel cells (AEMFC) are usually operated with hydrogen containing fuels having the lowest possible content of $CO_2$. Research has proved that as little as 5 ppm of $CO_2$ can harm the performance of the fuel cell. In order to reduce the amount of $CO_2$ in the cell, complicated and sometime expensive $CO_2$ filtering systems are added before the fuel entrance to the fuel cell.

Currently used anode catalysts for AEMFC include mostly Platinum (Pt) nanoparticles which are becoming inefficient when operating with $CO_2$-containing fuel. The anode $H_2$ oxidation reaction (HOR) at Pt surfaces using bi-carbonate ions (as explained below in reactions (4) and (5)) is slower (and thus less favored) in comparison to the HOR using pure $H_2$ (reaction (1)). The concentration of carbonate and/or bi-carbonate ions in the anode therefore increases with time relative to [$OH^-$], and overall cell performance is therefore reduced. This reduces the ability to use cheaper fuels containing $CO_2$ (such as, reformed Methanol, Ethanol, etc.). The HOR in AEMFC in the presence of pure $H_2$ is given in reaction (1)

$$H_2 + 2OH^- \rightarrow 2H_2O + 2e^- \qquad (1)$$

In the presence of $CO_2$ some of the hydroxide ions ($OH^-$), coming to the anode through the membrane from the AEMFC cathode reaction, may transform to bi-carbonates ions according to reaction (2) and/or carbonates ions according to reaction (3):

$$CO_2 + OH^- \rightarrow HCO_3^- \qquad (2)$$

$$HCO_3^- + OH^- \rightarrow H_2O + CO_3^{2-} \qquad (3)$$

Bi-carbonate and carbonate ions have lower diffusivity than $OH^-$ ion and therefore may travel inside the AEMFC at lower velocity than $OH^-$, reducing the cell conductivity. Furthermore, bi-carbonate and carbonate ions accumulate at the AEMFC anode, at the expense of OH ions that are required for reaction. (1).

At such high $CO_2$ concentration at the anode, in addition to reaction. (1), two additional, alternative and parallel HOR reactions are available using the bi-carbonate and carbonate ions:

$$H_2 + CO_3^{2-} \rightarrow H_2O + CO_2 + 2e^- \qquad (4)$$

$$H_2 + 2HCO_3^- \rightarrow 2H_2O + 2CO_2 + 2e^- \qquad (5)$$

Therefore, electric current may be obtained using the bi-carbonate and carbonate ions according to reactions (4) and (5). However, catalyzing these reactions is more challenging and thus the overall efficiency of the HOR process of reactions (4) and (5) is significantly reduced.

Therefore, in order to use cheaper fuels and/or reduce the use of filtering there is a need to develop a catalyst that may activate and speed reactions (4) and (5).

SUMMARY OF THE INVENTION

Some aspects of the invention may be directed to a catalyst layer for anodes of Alkaline Exchange Membrane Fuel Cells (AEMFC). Such catalyst layer may include catalyst nanoparticles and an ionomer. In some embodiments, each catalyst nanoparticle may include one or more nanoparticles of catalytically active metal supported on at least one nanoparticle of a conductive compound, for example, crystalline $RuO_2$. In some embodiments, the diameter of the at least one nanoparticle of a conductive compound may be about order of magnitude larger than the diameter of the one or more nanoparticles of catalytically active metal.

In some embodiments, the catalytically active metal may be selected from a group consisting of: Pt, Pd, Ir, Ru and their alloys. In some embodiments, the conductive compound may be selected from a group consisting of: crystalline metal oxides, crystalline $RuO_2$, crystalline doped $TiO_2$. In some embodiments, each catalyst nanoparticle further comprises one or more catalytically non-active metallic nanoparticles. In some embodiments, the one or more catalytically non-active metallic nanoparticles may be selected from a group consisting of: Ru, Ag, Ni, Fe.

In some embodiments, the catalyst nanoparticles may include between 2 wt. % to at most 20 wt. % of the catalytically active metal. In some embodiments, the size of the catalytically active metal nanoparticles is between 2-10 nm. In some embodiments, the catalyst layer may have at thickness of at most 25 micrometer. In some embodiments, the catalyst layer may include between 5-35 wt. % ionomer.

Some additional aspects of the invention may be directed to a catalyst layer for anodes of Alkaline Exchange Membrane Fuel Cells (AEMFC). This catalyst layer may include catalyst nanoparticles having one or more nanoparticles of catalytically active metal supported on at least one Ru nanoparticle and an ionomer. In some embodiments, the catalytically active metal may be selected from a group consisting of: Pt, Pd, Ir, Ru and their alloys.

In some embodiments, each catalyst nanoparticle may further include at least one nanoparticle of a conductive compound. In some embodiments, the conductive compound may be selected from a group consisting of: metal oxides, crystalline $RuO_2$, crystalline doped $TiO_2$. In some embodiments, the at least one Ru nanoparticle may have a diameter about one order of magnitude larger than the diameter of the one or more nanoparticles of catalytically active metal. In some embodiments, the size of the catalytically active metal nanoparticles may be between 2-10 nm.

In some embodiments, the size of the catalytically active metal nanoparticles is between 2-10 nm. In some embodiments, the catalyst layer may have at thickness of at most 25 micrometer. In some embodiments, the catalyst layer may include between 5-35 wt. % ionomer.

Some aspects of the invention may be directed to an Alkaline Exchange Membrane Fuel Cell. The Alkaline Exchange Membrane Fuel Cell may include an Alkaline Exchange Membrane, a cathode catalyst coated on a first side of the Alkaline Exchange Membrane; and an anode catalyst according to some embodiments of the invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
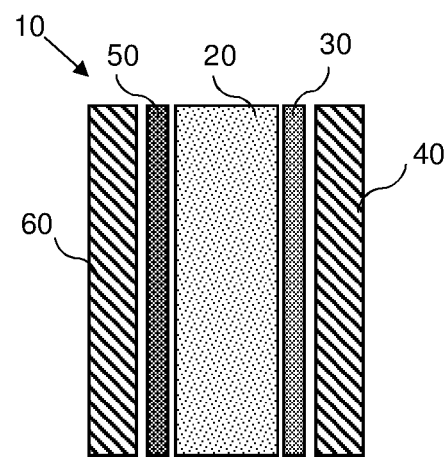
FIG. 1 is an illustration of an alkaline exchange membrane fuel cell according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Some aspects of the invention may be related to increasing the ability to use cheaper fuels containing $CO_2$ (such as reformed Methanol, Ethanol, etc.) in Alkaline Exchange Membrane Fuel Cells (AEMFC). In order to do so, special catalysts have been developed. Such catalysts may enable to produce electrical current using reactions (4) and (5) disclosed above. In some embodiments, the newly developed catalysts may further enhance reaction (1), thus improving the overall performance of the AEMFC.

A catalytic layer for AEMFC may have to exhibit the following properties and performances. For a commercial cost-effective catalytic layer, one may like to minimize the amount of platinum group metals (PGM) due to their high costs. Furthermore, the catalyst layer may have to create electronic percolation using high electrical conducting material. In some embodiments the catalytic layer thickness may be selected as to avoid mass transport issues and keep low overall resistance. Materials selected to be included in the catalyst layer may be as little hydrophobic as possible in order to allow proper water transport. The catalytic layer may further include a sufficient amount of ionomer to allow ion and water transport and a sufficient amount of porosity to allow gas penetration. Accordingly, such catalyst layer may include a conductive hydrophilic support particles to support the minimal amount of costly active material (e.g., PGM) required.

The commonly used carbon particles support is highly hydrophobic and has low tap density that may make the catalyst layer too thick.

A catalyst according to some embodiments of the invention may include catalyst nanoparticles, in which each catalyst nanoparticle may include at least two different types of nanocrystals: catalytically active metallic nanocrystals supported, attached and/or carried on larger electrically conducting compound nanocrystals. As used herein catalytically active metallic nanocrystals may include metallic nanocrystals that catalytically activate the chemical reactions taking place on the surface of the anode and the cathode of the AEMFC, for example, reactions (1)-(5) disclosed herein above. In some embodiments, the electrically conducting nanocrystals may be configured to increase the surface area of the catalytically active metallic nanocrystals. In some embodiments, the catalyst may further include an ionomer holding the catalyst nanoparticle as a layer. The ionomer may be crosslinked or may not be crosslinked to the anion conducting membrane.

Reference is now made to FIG. 1 which is an illustration of an AEMFC according to some embodiments of the invention. An AEMFC 10 may include an anion conducting membrane 20 a cathode catalyst layer 30 coated on the cathode side of membrane 20, a cathode gas diffusion layer (GDL) 40, an anode catalyst layer 50 coated or attached to the anode side of membrane 20 and anode GDL 60. Anion conducting membrane 20 may be any membrane configured to conduct anions such as $OH^-$, $CO_3^{2-}$ and $HCO_3^-$. In some embodiments, membrane 20 may include anions conducting solid polymer electrolyte that includes hydrocarbon backbone polymer, for example, Tokuyama AS4™, Fumatech FAA-3™, or aminated Poly Chloromethyl Styrene (also known as Poly Vinyl Benzyl Chloride) and the like.

Cathode catalyst layer 30 may include any suitable cathode catalyst metal, such as Ag with any suitable additives such as carbon, ionomer, etc.

GDLs 40 and 60 may include porous material made from a dense array of carbon fibers (base e.g., on carbon paper, carbon cloth, carbon fiber or the like, with or without a micro porous layer (MPL). These GDLs may also provide an electrically conductive pathway for current collection. In some embodiments, GDLs 40 and 60 may allow passage for reactant transport and heat/water removal. GDLs 40 and 60 may further provide mechanical support to membrane 20 and protection of catalyst layers 30 and 50 from corrosion or erosion caused by flows or other factors.

Figure 2:
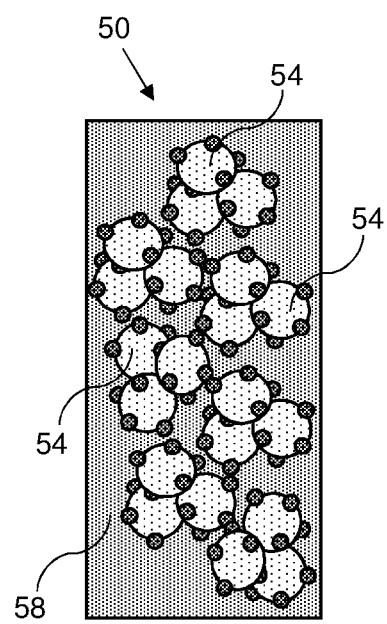
FIG. 2 is an illustration of an anode catalyst layer for an alkaline exchange membrane fuel cell according to some embodiments of the invention.

Reference is now made to FIG. 2 which is an illustration of anode catalyst layer 50 according to some embodiments of the invention. Anode catalyst layer 50 may include catalyst nanoparticles 54 and an ionomer 58. Ionomer 58 may include any ionomer suitable for carrying a catalyst in an AEMFC. For example, ionomer 58 may include Tokuyama AS4, Fumatech FAA-3, or aminated Poly Chloromethyl Styrene (also known as Poly Vinyl Benzyl Chloride) and the like. Materials selected to be included in catalyst layer 50 may be as little hydrophobic as possible in order to allow proper water transport. Catalytic layer 50 may include a sufficient amount of ionomer 85 to allow ion and water transport and a sufficient amount of porosity to allow gas penetration. In some embodiments, catalyst layer 50 may include between 5-35 wt. % ionomer. In some embodiments, catalyst layer 50 may have a thickness of at most 25 micrometer.

Figure 3A:
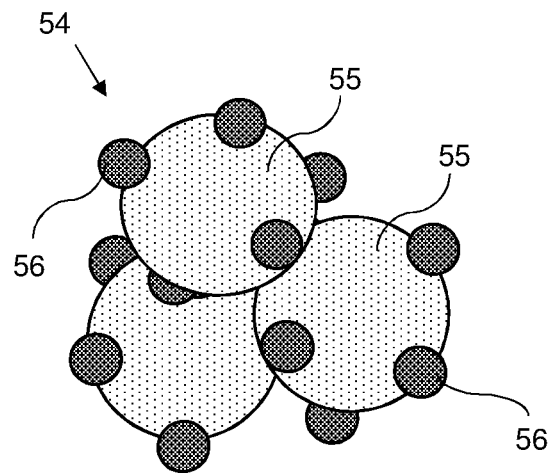
FIGS. 3A and 3B are illustration of nanoparticles of an anode catalyst for an alkaline exchange membrane fuel cell according to some embodiments of the invention.
Figure 3B:
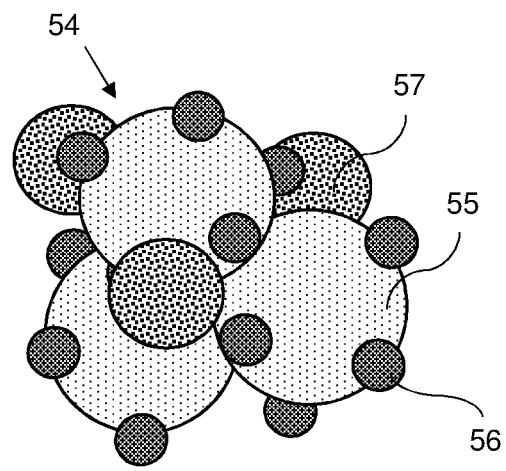

Reference is now made to FIGS. 3A and 3B which are illustrations of a catalyst nanoparticle 54 according to some embodiments of the invention. Catalyst nanoparticle 54 may include one or more nanoparticles 56 of catalytically active metal supported, carried and/or attached to at least one nanoparticle 55 of a conductive compound, as illustrated in FIG. 3A. In some embodiments, catalytically active metal nanoparticles 56 may have a diameter of at least one order of magnitude smaller than conductive compound nanoparticle 55 diameter. In some embodiments, each one of conductive compound nanoparticle 55 and catalytically active metal nanoparticles 56 may be either crystalline of non-crystalline. For example, the size (e.g., average diameter) of catalytically active metal nanoparticles 55 may be between 2-10 nm and the size (e.g., average diameter) of conductive compound nanoparticles 56 may be between 20-100 nm.

In some embodiments, the catalytically active metal may be selected from a group consisting of: PGM, such as, Pt, Pd, Ir and their alloys. In some embodiments, catalytically active metal nanoparticles 55 may include a nanocrystal of the catalytically active metal. In some embodiments, the conductive compound may be selected to be as little hydrophobic as possible, as explained above. In some embodiments, the conductive compound may be selected from a group consisting of: crystalline metal oxides such as, crystalline $RuO_2$, crystalline doped $TiO$, $Nb_xO_y$, crystalline metal carbides, such as WC and the like. As used herein crystalline $RuO_2$ may include nano crystals of $RuO_2$ that may or may not include doping. In some embodiments, conductive compound nanoparticles 56 may include a nanocrystal of the conductive compound.

In some embodiments, the catalyst nanoparticle 54 may further include one or more catalytically non-active metallic nanoparticles 57, as illustrated in FIG. 3B. In some embodiments, one or more catalytically non-active metallic nanoparticles 57 may be selected from a group consisting of: Ru, Ag, Ni, Fe nanoparticles. In some embodiments, one or more of catalytically non-active metallic nanoparticles 57 may be a nanocrystal. In some embodiments, the size of catalytically non-active metallic nanoparticle 57 may be between 10-50 nm, between 10-100 nm or more than 100 nm.

Figure 4:
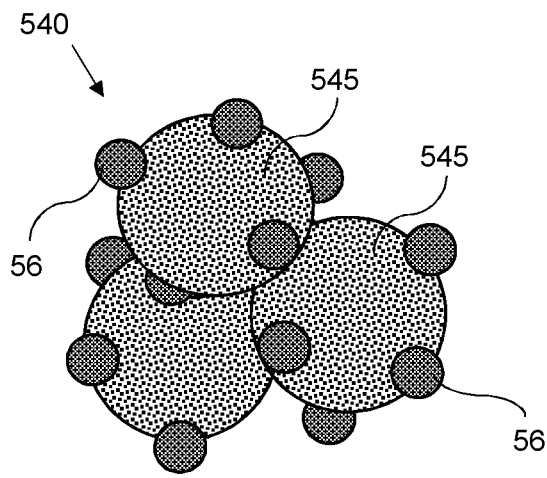
FIG. 4 is an illustration of a nanoparticle of an anode catalyst for an alkaline exchange membrane fuel cell according to some embodiments of the invention.

Some aspects of the invention may be related to a catalyst layer for anodes of Alkaline Exchange Membrane Fuel Cells (AEMFC), such as layer 50, that include catalyst nanoparticles 540 (illustrated in FIG. 4) and an ionomer, such as the ionomer 58 illustrated and discussed with respect to FIG. 2. Reference is now made to FIG. 4 which is an illustration of catalyst nanoparticle 540 that may include one or more nanoparticles 56 of catalytically active metal supported, carried and/or attached on at least one Ru nanoparticle 545. Catalytically active nanoparticles 56 included in nanoparticles 540 may be substantially the same as nanoparticles 56 included in catalyst nanoparticles 54. In some embodiments, Ru nanoparticle 545 may be crystalline. In some embodiments, the size (e.g., average diameter) of Ru nanoparticle 545 may be at least one order of magnitude larger than catalytically active nanoparticles 56.

Experimental Results

Catalysts nanoparticles were prepared using any known method. For example, the catalyst nanoparticles may be prepared by reduction of a salt of the required metal(s), e.g. $RuCl_3.xH_2O$ or similar, by the use of a suitable reducing agent such as sodium acetate, sodium or other borohydride, hydrazine, or any number of other available known reducing agents. For example, the precursor materials may be held in aqueous solution and heated under reflux conditions or hydrothermal conditions, or by heating by microwave or other direct radiation. In these examples, depending on the process chosen, the metal salt and the reducing agent can be pre-mixed or mixed after heating to a desired temperature. Blending of the reducing agent with the metal salt, possibly with additional treatment such as heating, may lead to the formation of nucleated metal clusters that develop with time into nanoparticles in the reaction mixture. The growth of these particles may be controlled by reaction time, temperature, and in some cases the presence of surface-active agents (surfactants) or other additives to moderate growth of the particles.

Once the reaction have been proceeded to completion (yielding nanoparticles of the desired size, morphology etc.), the reaction mixture may be removed from the reaction conditions (e.g., cooled to room temperature and/or pressure) and the supernatant then separated from the particles. Additives and remaining reactants may be subsequently washed and/or burned away. Exposure to oxygen during the process may lead to the formation of metal oxide(s) together with or in place of, or as a part of, the metal particles. This can also typically be controlled to a certain degree.

Another example for a method of preparing catalyst nanoparticles may include: depositing catalytic nanoparticles on the support particles by following a similar procedure but using a salt of the catalytic metal(s), with the same or different combinations of reducing agent(s) and surfactant(s), in the presence of pre-formed support particles.

In yet another example, the catalytic particles may be prepared separately and later mixed mechanically by various means known in the art such as stirring, sonication and/or other homogenizing techniques applied to a co-dispersion, and/or by ball milling or other processing techniques. Alternatively, the two types of particles may be prepared in a single step where salts of both metals are present in the reaction mixture. Such a one-step process (mixing the salts of different metals together) could lead either to alloys of the various particles, separate particles of one species and another, or a mixture of those.

The catalyst nanoparticles included: 15 weight (wt.)% Pt, 42.5 wt. % RuO2 and 42.5 wt. % Ru or 9 wt. % Pt, 45.5 wt. % RuO2 and 45.5 wt. % Ru. The catalysts nanoparticles were analyzed using HRTEM and XRD and added to an ionomer to form a catalytic layer of a solid electrolyte membrane. The performance of the new catalytic layer were tested during the operation of an AEMFC.

Figure 5:
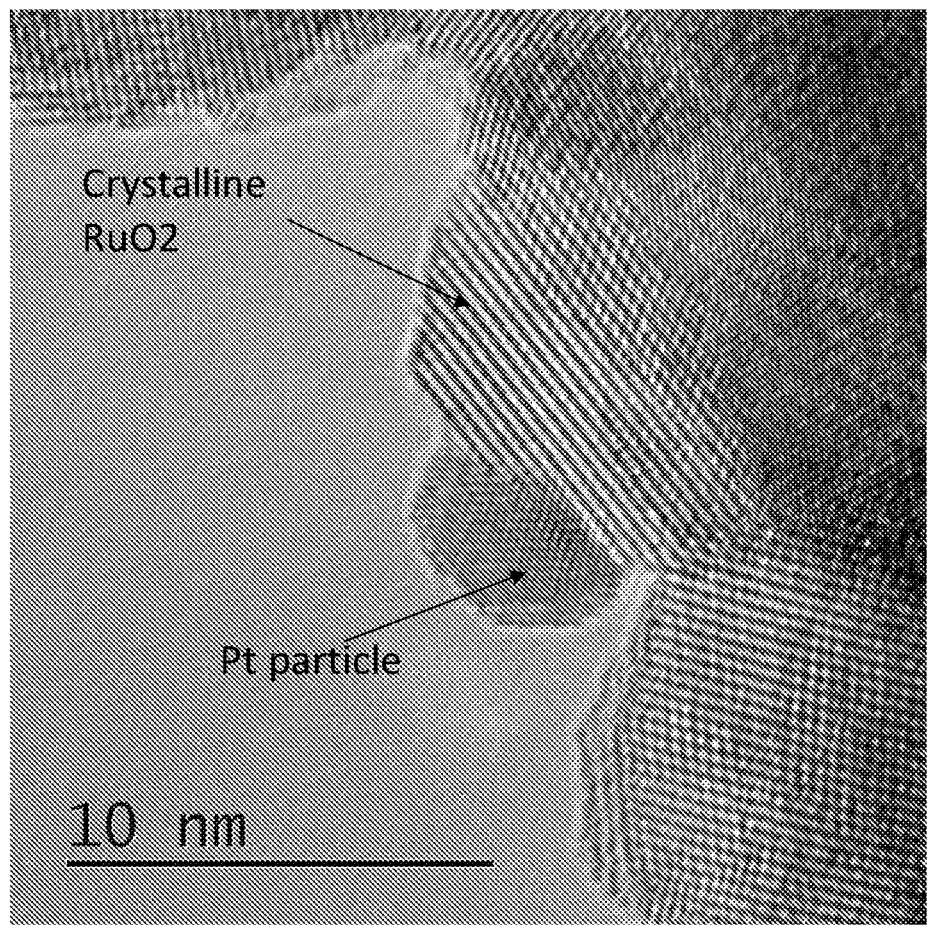
FIG. 5 is a high resolution transmission electron micrograph (lattice image) of a nanoparticle according to some embodiments of the invention.

Reference is now made to FIG. 5 which is a lattice image taken by a high resolution transmission electron microscope of a catalyst nanoparticle according to some embodiments of the invention. The image shows a small Pt crystal having a diameter of approximately 5 nm attached to a larger $RuO_2$ crystal having a dimeter of approximately 10 nm.

Figure 6:
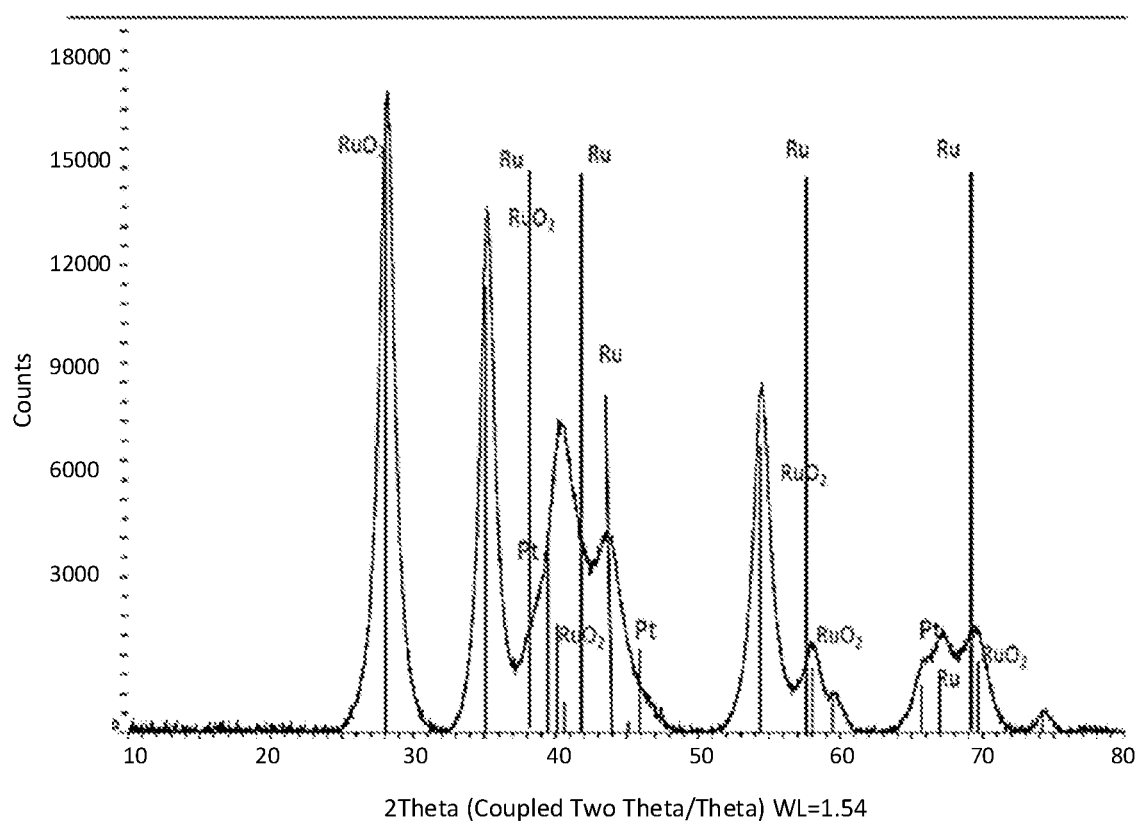
FIG. 6 is an X-Ray diffraction of a catalyst for an alkaline exchange membrane fuel cell according to some embodiments of the invention.

Reference is now made to FIG. 6 which is an XRD spectrum taken from the catalyst according to some embodiments of the invention. The XRD maxima were identified as the typical maxima of crystalline Pt, Ru and $RuO_2$.

Figure 7A:
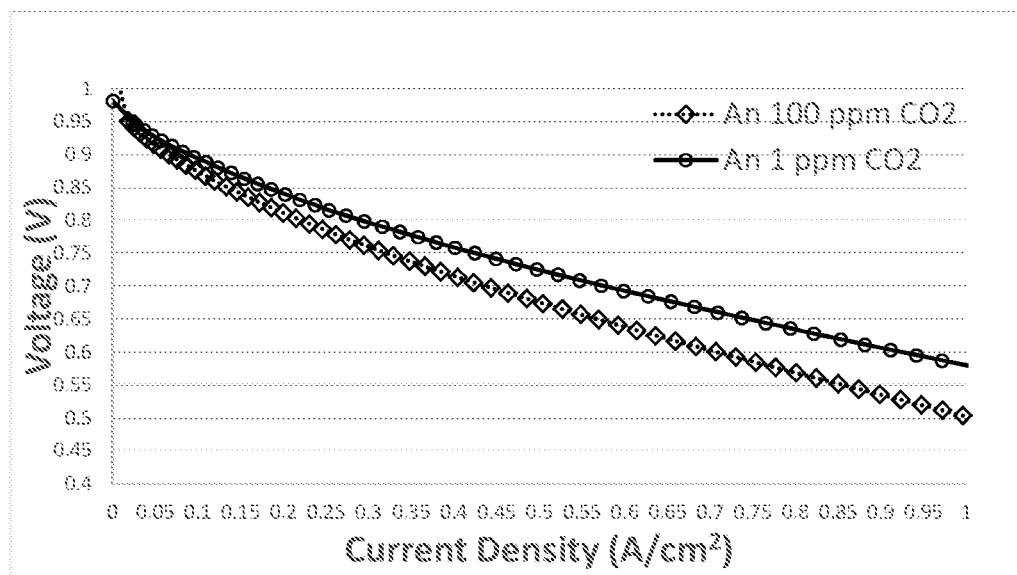
FIGS. 7A-7C are graphs of Voltage vs. Current Density of alkaline exchange membrane fuel cells with Pt based anode catalyst and anode catalysts according to some embodiments of the invention.

The performance of the new catalyst was tested and compared to known catalyst made from Pt nanoparticles. FIG. 7A shows graphs showing the voltage vs. the current density taken from an AEMFC that included the Pt anode catalyst when supplied with two types of fuels: a clean $H_2$ having less than 1 ppm $CO_2$ and $H_2$ with 100 ppm $CO_2$. As can clearly be seen, there is a loss of more than 10% in the voltage at high current densities (above 0.6 $A/cm^3$) when operating the cell with $H_2$ with 100 ppm $CO_2$.

Figure 7B:
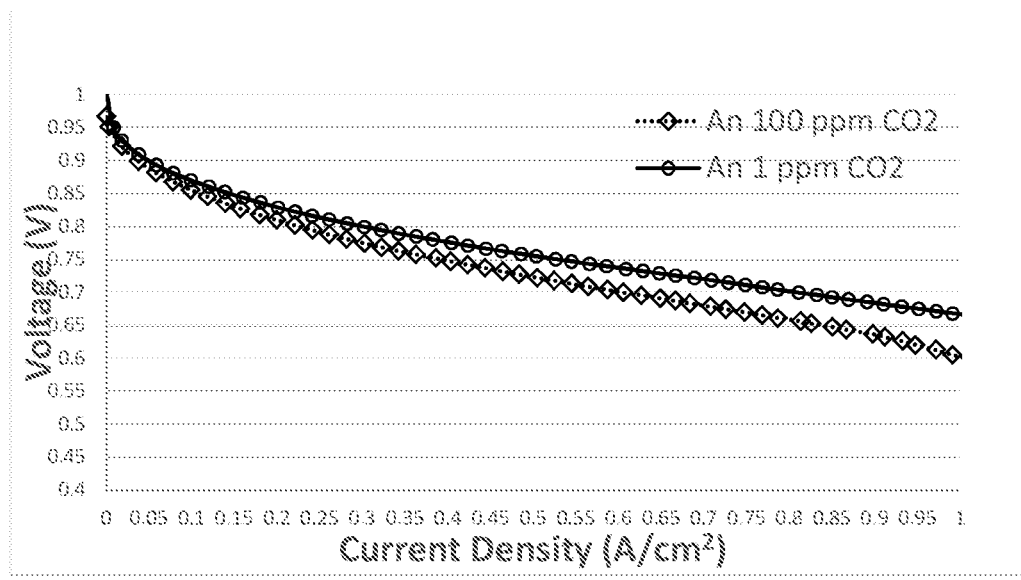

FIG. 7B shows graphs showing the voltage vs. the current density taken from an AEMFC that included an anode catalyst according to some embodiments of the invention. The catalyst of FIG. 7B included 15 wt. % Pt, 42.5 wt. % $RuO_2$ and 42.5 wt. % Ru. As can clearly be seen less than 10% (approximately 7%) loss in the voltage at high current densities (above 0.6 $A/cm^3$) when operating the cell with $H_2$ with 100 ppm $CO_2$ has been achieved.

Figure 7C:
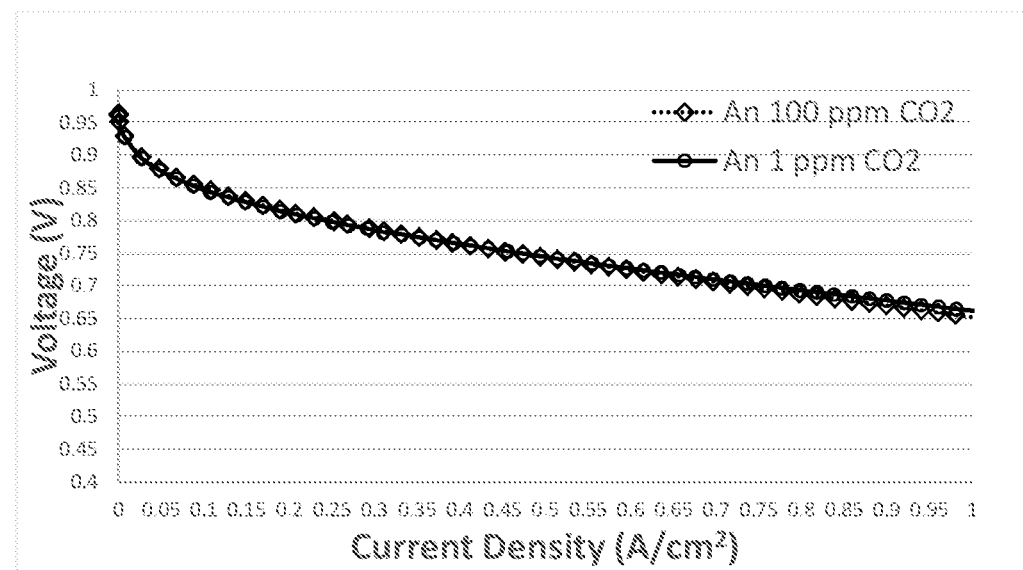

FIG. 7C shows graphs showing the voltage vs. the current density taken from an AEMFC that included an anode catalyst according to some embodiments of the invention. The catalyst of FIG. 7C included 9 wt. % Pt, 45.5 wt. % $RuO_2$ and 45.5 wt. % Ru. As can clearly be seen there is no losses at all when operating the cell with the new catalysts. Furthermore, the overall drop in voltage at higher current densities of the cell operating in both types of fuels is 20% less than the drop in the fuel cell of FIG. 7A operating with pure $H_2$. Accordingly, a catalysts made according to embodiments of the invention may improve the performance of the fuel cell operating which any type of fuel in comparison to fuel cells known in the art.

Figure 8:
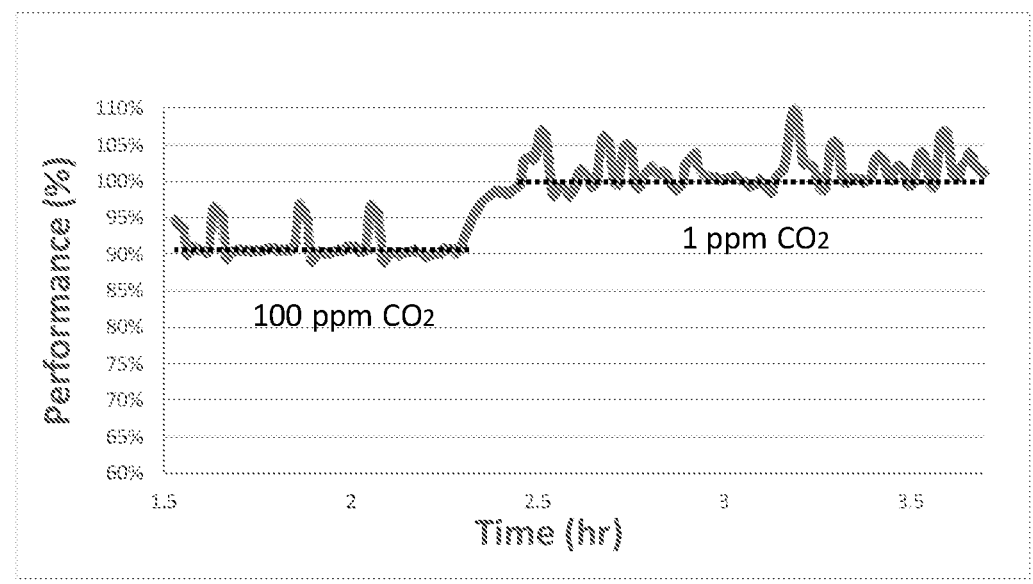
FIG. 8 is a graph of the performance over time of alkaline exchange membrane fuel cells having an anode catalyst according to some embodiments of the invention.

FIG. 8 shows the performance (in percentage; voltage, current or power) over time of a cell with a catalyst according to embodiments of the invention (the catalyst of FIG. 7B) operating with fuels having 100 ppm and 1 ppm levels of $CO_2$ at the anode fuel stream. As can clearly be seen the performance drops by approximately 9% over time when operating the fuel cell with fuel having 100 ppm of $CO_2$.

Figure 9:
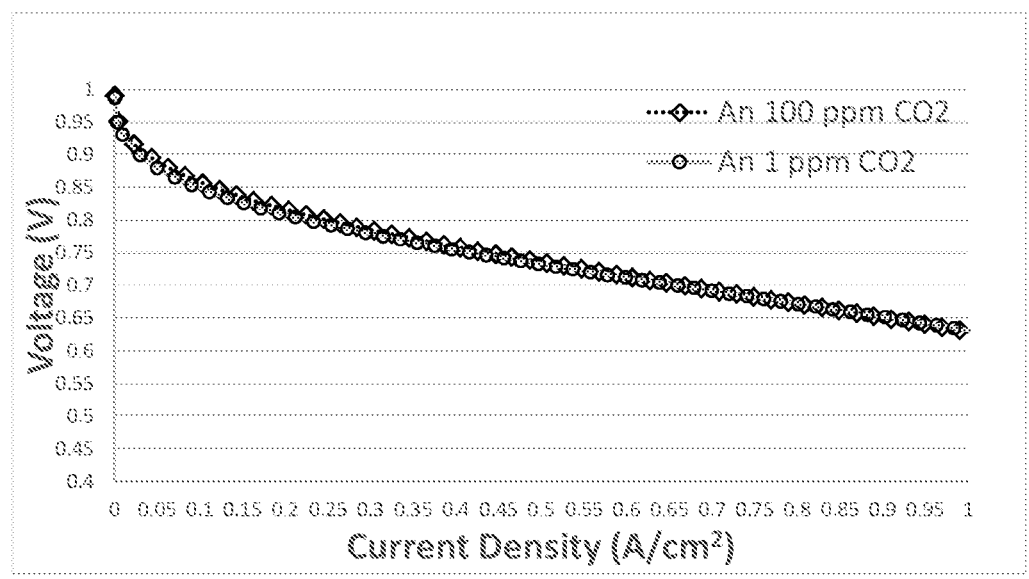
FIG. 9 is a graph of Voltage vs. Current Density of alkaline exchange membrane fuel cells with Ir based anode catalyst according to some embodiments of the invention.

FIG. 9 shows graphs showing the voltage vs. the current density taken from an AEMFC that included an anode catalyst according to some embodiments of the invention. The catalyst of FIG. 9 included Ir, $RuO_2$ and Ru. As can clearly be seen there is no loses at all when operating the cell with the new catalysts with both fuel types having 1 and 100 ppm of $CO_2$. Accordingly, an Ir based catalyst made according to embodiments of the invention may improve the performance of the fuel cell operating which any type of fuel in comparison to fuel cells known in the art.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A catalyst layer for anodes of Alkaline Exchange Membrane Fuel Cells (AEMFC), comprising:
   catalyst nanoparticles, wherein each catalyst nanoparticle comprises: one or more nanoparticles of catalytically active metal supported on at least one Ru nanoparticle; and
   an ionomer.

2. A catalyst layer according to claim 1, wherein the catalytically ctive metal is selected from a group consisting of: Pt, Pd, Ir, and their alloys.

3. A catalyst layer according to claim 1, wherein each catalyst nanoparticle further comprises at least one nanoparticle of a conductive compound.

4. A catalyst layer according to claim 3, wherein the conductive compound is selected from a group consisting of: crystalline $RuO_2$, crystalline doped $TiO_2$, crystalline WC and crystalline NbOx.

5. A catalyst layer according to claim 1, wherein the diameter of the at least one Ru nanoparticle is at least one order of magnitude larger than the diameter of the one or more nanoparticles of catalytically active metal.

6. A catalyst layer according to claim 1, wherein the size of the catalytically active metal nanoparticles is between 2-10 nm.

7. A catalyst layer according to claim 1, having at thickness of at most 25 micrometer.

8. A catalyst layer according to claim 1, comprising between 5-35 wt. % ionomer.

* * * * *